United States Patent
Aono et al.

(10) Patent No.: US 11,073,092 B2
(45) Date of Patent: Jul. 27, 2021

(54) CONTROL DEVICE FOR INTERNAL COMBUSTION ENGINE

(71) Applicant: Hitachi Automotive Systems, Ltd., Hitachinaka (JP)

(72) Inventors: Toshihiro Aono, Tokyo (JP); Masayuki Saruwatari, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 56 days.

(21) Appl. No.: 16/607,269

(22) PCT Filed: Jan. 31, 2018

(86) PCT No.: PCT/JP2018/003105
§ 371 (c)(1),
(2) Date: Oct. 22, 2019

(87) PCT Pub. No.: WO2018/207412
PCT Pub. Date: Nov. 15, 2018

(65) Prior Publication Data
US 2020/0300184 A1    Sep. 24, 2020

(30) Foreign Application Priority Data

May 10, 2017 (JP) .............................. JP2017-094177

(51) Int. Cl.
*F02D 35/02* (2006.01)
*F02B 75/04* (2006.01)
(Continued)

(52) U.S. Cl.
CPC .......... *F02D 35/024* (2013.01); *F02B 75/047* (2013.01); *F02D 41/009* (2013.01); *F02P 5/10* (2013.01)

(58) Field of Classification Search
CPC ...... F02D 35/024; F02D 41/009; F02D 15/00; F02D 35/023; F02B 75/047; F02B 75/045; F02P 5/10; F02P 5/15
See application file for complete search history.

(56) References Cited

U.S. PATENT DOCUMENTS 4,424,790 A * 1/1984 Curtil ................. F02D 13/0269
                                                  123/559.1
7,588,001 B2 * 9/2009 Branyon ................ F02B 33/22
                                                  123/70 R
(Continued)

FOREIGN PATENT DOCUMENTS

| JP | 2005-140054 A | 6/2005 |
| JP | 2010-174757 A | 8/2010 |
| WO | WO 2014/141729 A1 | 9/2014 |

OTHER PUBLICATIONS

International Search Report (PCT/ISA/210) issued in PCT Application No. PCT/JP2018/003105 dated May 29, 2018 with English translation (two (2) pages).
(Continued)

Primary Examiner — Joseph J Dallo
(74) Attorney, Agent, or Firm — Crowell & Moring LLP

(57) ABSTRACT

Provided is a control device for an internal combustion engine capable of estimating a compression ratio of the internal combustion engine at the time of fuel cut of the internal combustion engine and without being affected by an intake air amount and an intake air temperature. A compression ratio ε is calculated on the basis of a change of in-cylinder pressure P with respect to crank angle θ at timing when an in-cylinder volume change rate dV/dθ/V takes an extreme value or at timing from closing of an intake valve 109 to the start of ignition of the air-fuel mixture in the cylinder.

11 Claims, 10 Drawing Sheets

(51) Int. Cl.
    *F02D 41/00*     (2006.01)
    *F02P 5/10*     (2006.01)

(56) References Cited

U.S. PATENT DOCUMENTS

| | | | | |
|---|---|---|---|---|
| 10,519,879 | B2 * | 12/2019 | Shiraishi | F02P 3/0407 |
| 2006/0272608 | A1 * | 12/2006 | Hara | F01L 13/0015 |
| | | | | 123/182.1 |
| 2007/0023005 | A1 * | 2/2007 | Chmela | F02M 26/06 |
| | | | | 123/305 |
| 2007/0089697 | A1 * | 4/2007 | Hara | F02D 35/023 |
| | | | | 123/90.15 |
| 2010/0043753 | A1 * | 2/2010 | Gallagher | F02D 41/40 |
| | | | | 123/447 |
| 2010/0222989 | A1 * | 9/2010 | Nishimura | F02D 41/0002 |
| | | | | 701/105 |
| 2011/0108012 | A1 * | 5/2011 | Bryant | F02M 26/22 |
| | | | | 123/568.11 |
| 2015/0354488 | A1 * | 12/2015 | Hiyoshi | F02D 41/3076 |
| | | | | 123/48 B |
| 2018/0113963 | A1 * | 4/2018 | Kordon | F02D 41/26 |

OTHER PUBLICATIONS

Japanese-language Written Opinion (PCT/ISA/237) issued in PCT Application No. PCT/JP2018/003105 dated May 29, 2018 (five (5) pages).

* cited by examiner

CONTROL DEVICE FOR INTERNAL COMBUSTION ENGINE

TECHNICAL FIELD

The present invention relates to a control device that estimates a compression ratio of an internal combustion engine, and more particularly to a control device that estimates a compression ratio of an internal combustion engine (variable compression ratio internal combustion engine) having a variable compression ratio mechanism to allow the compression ratio to be variable.

BACKGROUND ART

In one example of this type of prior art, PTL 1 discloses, in a variable compression ratio internal combustion engine in which a piston of the internal combustion engine and a crank shaft are connected via a plurality of link members, and a control link that limits the degree of freedom of link members is provided, with the base end of this control link being swingably connected to an eccentric shaft of the control shaft such that the compression ratio changes according to the rotational position of the control shaft, a technique for obtaining a peak value during the cycle of the torque required for holding the control shaft in the predetermined compression ratio state in the case of fuel cut of the internal combustion engine and estimating the an actual compression ratio from the peak torque.

CITATION LIST

Patent Literature

PTL 1: JP 2010-174757 A

SUMMARY OF INVENTION

Technical Problem

Meanwhile, as described in PTL 1, in the method of estimating the compression ratio from the peak value (peak torque) in the torque cycle, the torque peak value is affected by the amount of heat generated by combustion, so that it is necessary to limit to the case of fuel cut of the internal combustion engine. Further, the torque peak value is affected by the intake air amount and the intake air temperature, causing a problem that the intake air amount and the intake air temperature need to be accurately measured or restricted to a certain condition.

The present invention has been made in view of the above situations, and it is an object of the present invention to provide a control device for an internal combustion engine capable of estimating a compression ratio of the internal combustion engine at the time of fuel cut of the internal combustion engine and without being affected by an intake air amount and an intake air temperature.

Solution to Problem

In order to solve the above problems, a control device for an internal combustion engine according to the present invention estimates a compression ratio of the internal combustion engine including a cylinder in which an intake valve and an exhaust valve open and close in synchronization with rotation of a crank shaft connected to a piston, and the control device calculates the compression ratio on the basis of a change of in-cylinder pressure with respect to a crank angle at timing from closing of the intake valve to a start of ignition of an air-fuel mixture in the cylinder.

Advantageous Effects of Invention

According to the present invention, the compression ratio of the internal combustion engine can be estimated at the time of fuel cut of the internal combustion engine and without being affected by the intake air amount and the intake air temperature.

Other problems, configurations, and effects that have not been described above will be apparent from the following description of the embodiment.

DESCRIPTION OF EMBODIMENTS

Hereinafter, an embodiment of a control device for an internal combustion engine according to the present invention will be described with reference to the drawings.

Figure 1:
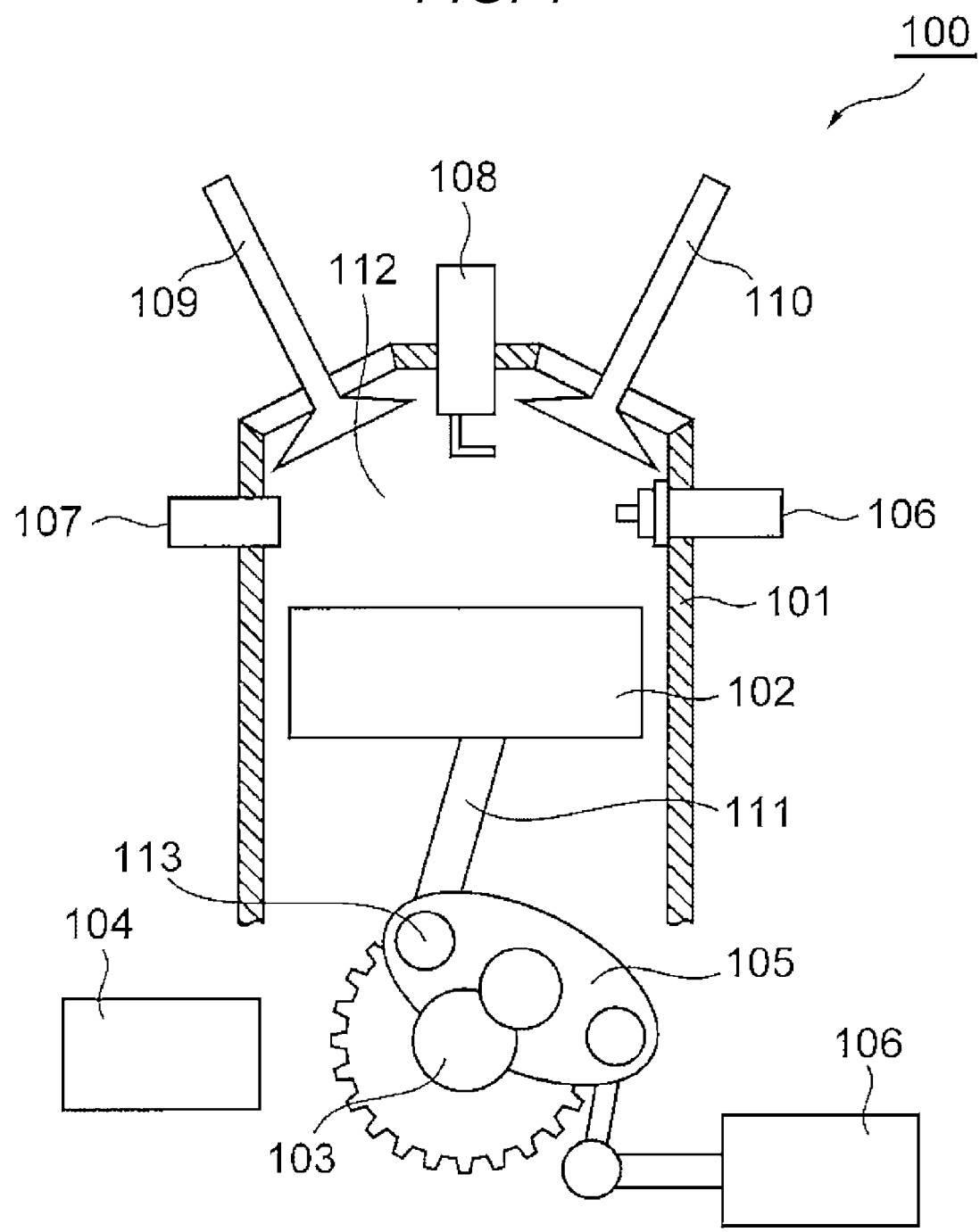
FIG. 1 is a diagram illustrating an example of an internal combustion engine to which a control device according to the present invention is applied.

FIG. 1 illustrates an internal combustion engine (a variable compression ratio internal combustion engine) (which may also be referred to as an engine or a variable compression ratio engine hereinafter) to which the control device according to the present invention is applied.

In an internal combustion engine 100 of the illustrated embodiment, an intake valve 109 and an exhaust valve 110 provided in a cylinder (air cylinder) 101 are opened and closed in synchronization with the rotation of a crank shaft 103, whereby air (intake air) is taken in the cylinder 101 (in-cylinder or in a combustion chamber). Fuel is injected into the intake air from an injector 106 to generate an air-fuel mixture in the cylinder 101. When the air-fuel mixture is ignited (lighted) with an ignition plug 108, a piston 102 is pushed down by the explosion energy, and the pushing force to the piston 102 is transmitted to the crank shaft 103 through a connecting rod 111 and a link mechanism 105 to rotate the crank shaft 103. The rotation of the crank shaft 103 is, for example, converted into the rotation of tires through the transmission, which is not illustrated, and becomes a driving force for an automobile or the like on which the internal combustion engine 100 is mounted.

Figure 2:
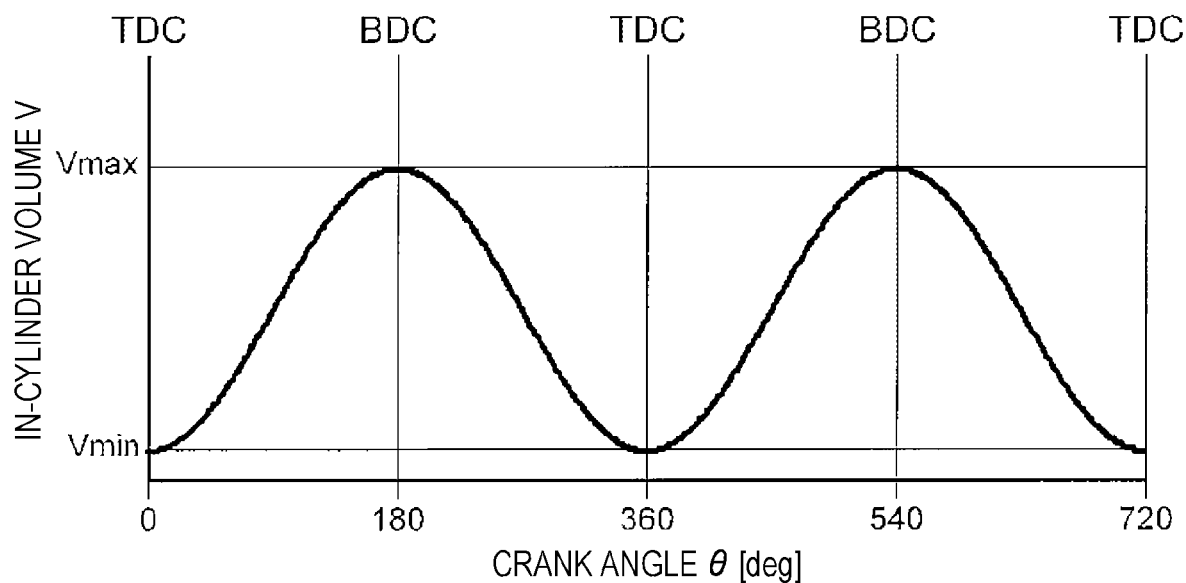
FIG. 2 is a graph illustrating an example of a relationship between a crank angle and an in-cylinder volume.
Figure 3:
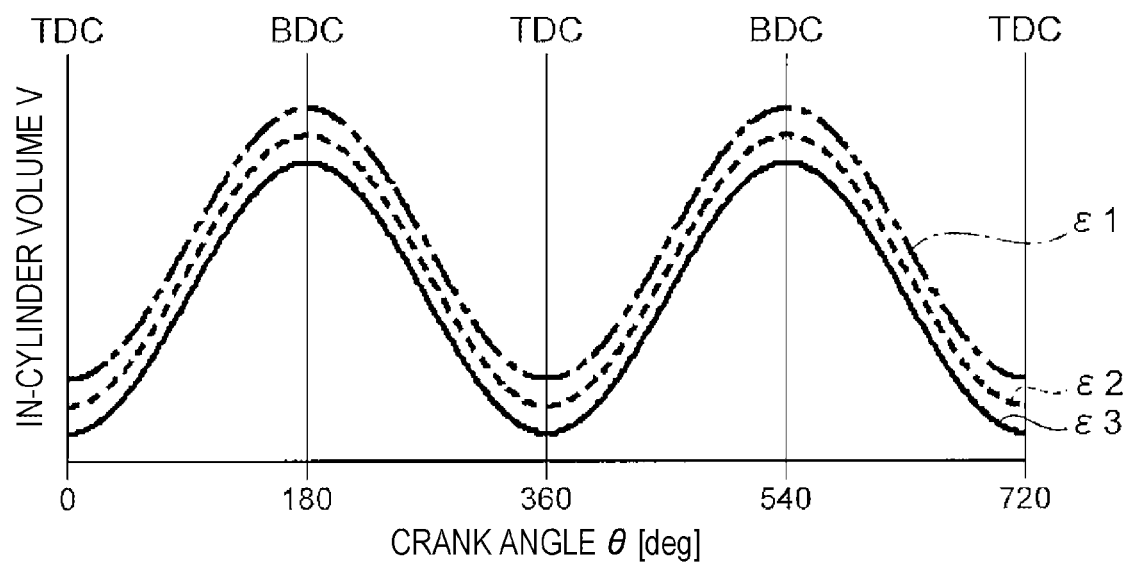
FIG. 3 is a graph illustrating an example of a relationship between a crank angle and an in-cylinder volume according to a compression ratio.

In such an internal combustion engine 100, a relationship between a crank angle θ of the crank shaft 103 (crank angle θ measured by a crank angle sensor 104) and a volume V in a combustion chamber 112 surrounded by the cylinder 101 and the piston 102 (in-cylinder volume) is provided as illustrated in FIG. 2. In other words, the volume V takes the minimum value Vmin at the top dead center (TDC) where the piston 102 is at the highest position, while the volume V takes the maximum value Vmax at the bottom dead center (BDC) where the piston 102 is at the lowest position. A ratio Vmax/Vmin between the minimum value Vmin and the maximum value Vmax is referred to as a compression ratio ε. In general, as the compression ratio ε increases, the efficiency of the engine 100 improves. However, if the compression ratio ε is increased in a high load region, knocking occurs and the engine 100 is damaged. The variable compression ratio engine 100, which has been developed in view of such a background, improves the efficiency of the internal combustion engine 100 by increasing the compression ratio ε in a low load region and decreasing the compression ratio ε in a high load region. Although the mechanism (variable compression ratio mechanism) that allows the compression ratio ε to be variable as described above is well known in its construction, the link mechanism 105 in the internal combustion engine 100 of the present embodiment is controlled by a compression ratio controller 106 to change a distance between the crank shaft 103 and a connecting point 113 of the connecting rod 111 and the link mechanism 105 and change the relationship between the crank angle θ and the volume V, thus enabling variable control of the compression ratio ε mechanically. The relationship between the crank angle θ and the volume V in the variable compression ratio engine 100 is, for example, illustrated in FIG. 3 plotting the relationship between the crank angle θ and the volume V for each compression ratios ε1, ε2, and ε3. Note that the compression ratio ε is not necessarily discrete but may change continuously.

Meanwhile, in such an internal combustion engine 100, for reasons such as manufacturing variations of the link mechanism 105, the compression ratio commanded by a control device 200 (see FIGS. 10 and 13 described later) for controlling the operating state of the internal combustion engine 100 may differ from the compression ratio obtained as a result of the actual control, so that it is necessary to estimate the actual compression ratio ε.

Figure 4:
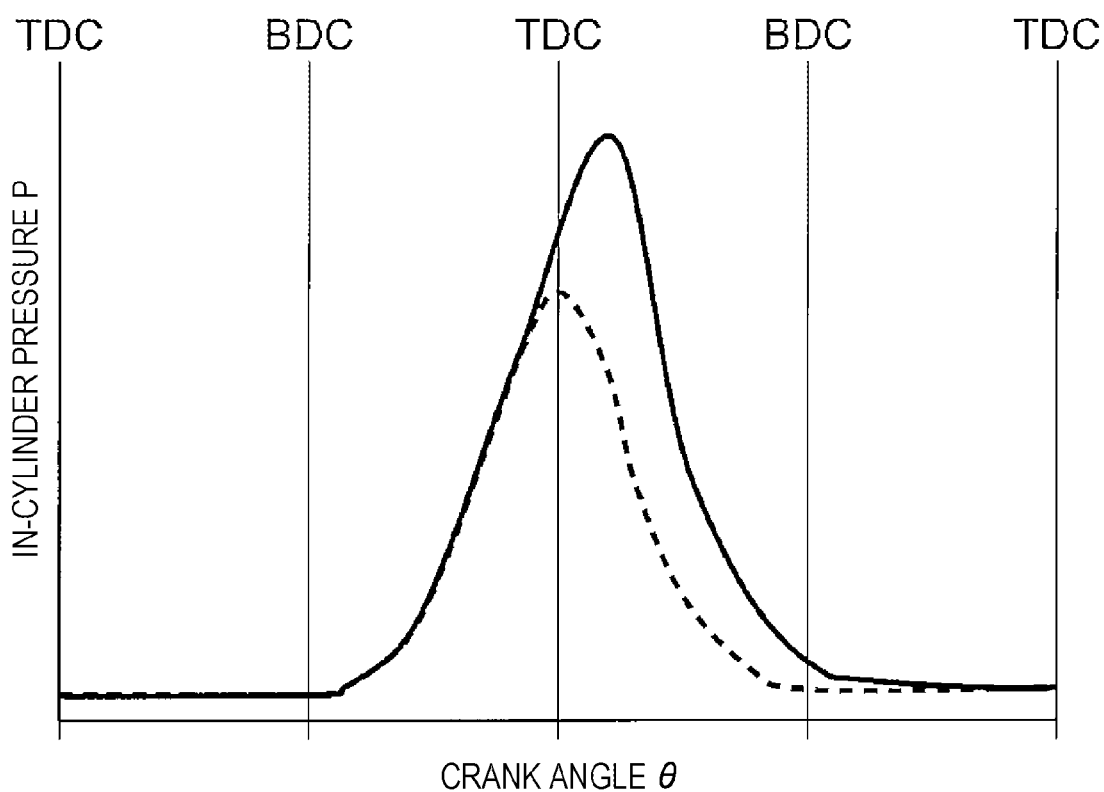
FIG. 4 is a graph illustrating an example of a relationship between a crank angle and an in-cylinder pressure.

To increase the efficiency of the internal combustion engine 100, it is desirable to measure and feed back the combustion state of the internal combustion engine 100, and it is considered recently to attach an in-cylinder pressure sensor 107 to the cylinder 101 to measure the pressure (in-cylinder pressure) P in the cylinder 101. In FIG. 4, the in-cylinder pressure P at the time of fuel cut is illustrated by a broken line, and the in-cylinder pressure P at the time of combustion is illustrated by a solid line in FIG. 4. When an intake air amount n and an intake air temperature T in the cylinder 101 are given and the in-cylinder pressure P is measured, the volume V can be determined from an equation of state of gas (Equation 1) where R is a gas constant of the air-fuel mixture.

[Math. 1]

$$V = \frac{nRT}{P} \tag{Equation 1}$$

Accordingly, the compression ratio ε can be identified from the crank angle θ and the volume V at the timing when the in-cylinder pressure P is measured, with reference to the relationship between the crank angle θ and the volume V for the individual compression ratios illustrated in FIG. 3.

Meanwhile, the above-described method for specifying the compression ratio ε is based on the premise that the intake air amount n and the intake air temperature T are known, but it is difficult for the actual engine 100 to measure the temperature in the cylinder. Further, although an air flow sensor for measuring the intake air amount is attached, it is difficult to estimate how the air that has passed through the air flow sensor enters each cylinder of the engine 100. Therefore, the present embodiment proposes a method of estimating the compression ratio ε even when the intake air amount n and the intake air temperature T are not known.

From the closing of the intake valve 109 provided in the cylinder 101 to the start of ignition and combustion of the air-fuel mixture, the interior of the cylinder 101 can be considered to be in an adiabatic step in which no heat is coming and going. At this time, between the volume (in-cylinder volume) V and the pressure (in-cylinder pressure) P, the relationship expressed by (Equation 2) below which is well known in the art of thermodynamics is established.

[Math. 2]

$$P \cdot V^\gamma = \text{Constant} \tag{Equation 2}$$

Differentiating (Equation 2) with the crank angle θ of the crank shaft 103 yields (Equation 3).

[Math. 3]

$$V^\gamma \cdot \frac{dP}{d\theta} + \gamma \cdot P \cdot V^{(\gamma-1)} \cdot \frac{dV}{d\theta} = 0 \tag{Equation 3}$$

Dividing both sides of (Equation 3) by P·V$_\gamma$ yields (Equation 4) below.

[Math. 4]

$$\frac{1}{P} \cdot \frac{dP}{d\theta} = -\gamma \cdot \frac{1}{V} \cdot \frac{dV}{d\theta} \tag{Equation 4}$$

Figure 5:
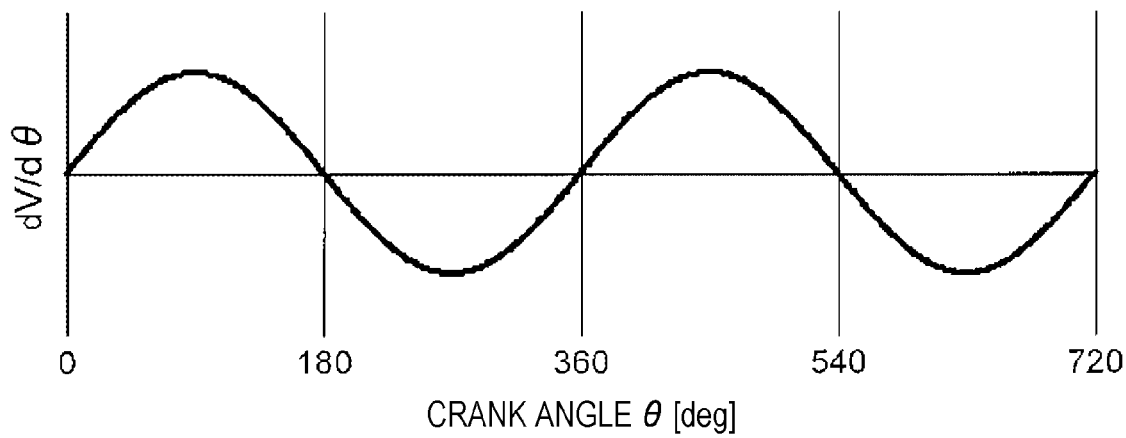
FIG. 5 is a graph illustrating an example of an in-cylinder volume differential value obtained by differentiating the in-cylinder volume by the crank angle.

As illustrated in FIG. 3, the relationship between the volume V of the variable compression ratio engine 100 and the crank angle θ can be approximated by parallel translation in the V-axis direction for the compression ratio ε, so that dV/dθ (in-cylinder volume differential value obtained by differentiating the in-cylinder volume (volume in the combustion chamber) V by the crank angle θ) does not rely on the compression ratio ε, as illustrated in FIG. 5.

Figure 6:
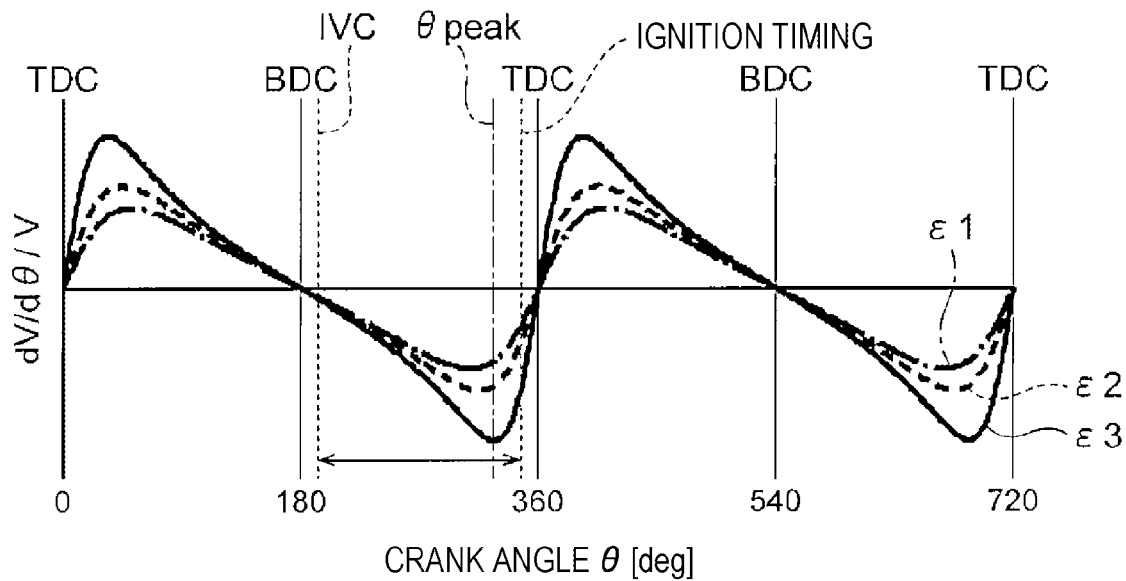
FIG. 6 is a graph illustrating an example of an in-cylinder volume change rate obtained by normalizing the in-cylinder volume differential value by the in-cylinder volume.
Figure 7:
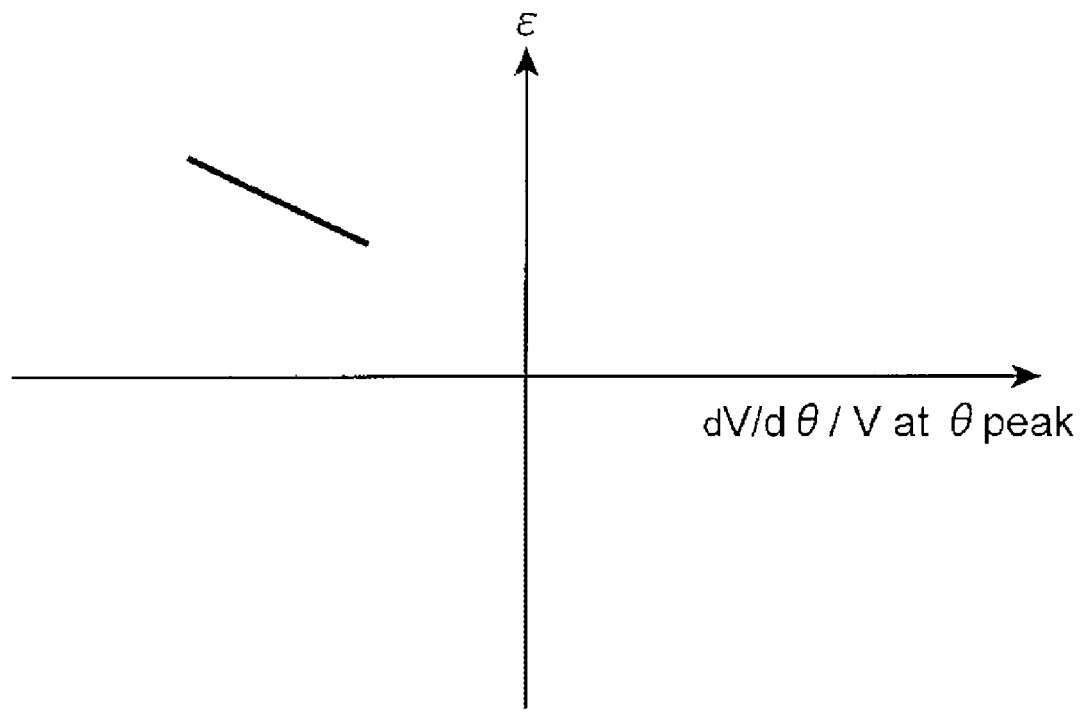
FIG. 7 is a graph illustrating an example of the relationship between the in-cylinder volume change rate and the compression ratio.

On the other hand, dV/dθ/V (in-cylinder volume change rate obtained by normalizing the in-cylinder volume differential value illustrated in FIG. 5 with the in-cylinder volume) for each compression ratio is illustrated in FIG. 6, in which an extreme value is at θ peak located about 30 degrees before the dead center TDC when the largest difference appears among the compression ratios ε. For example, the relationship between dV/dθ/V and the compression ratio ε at the θpeak is as illustrated in FIG. 7.

Figure 8:
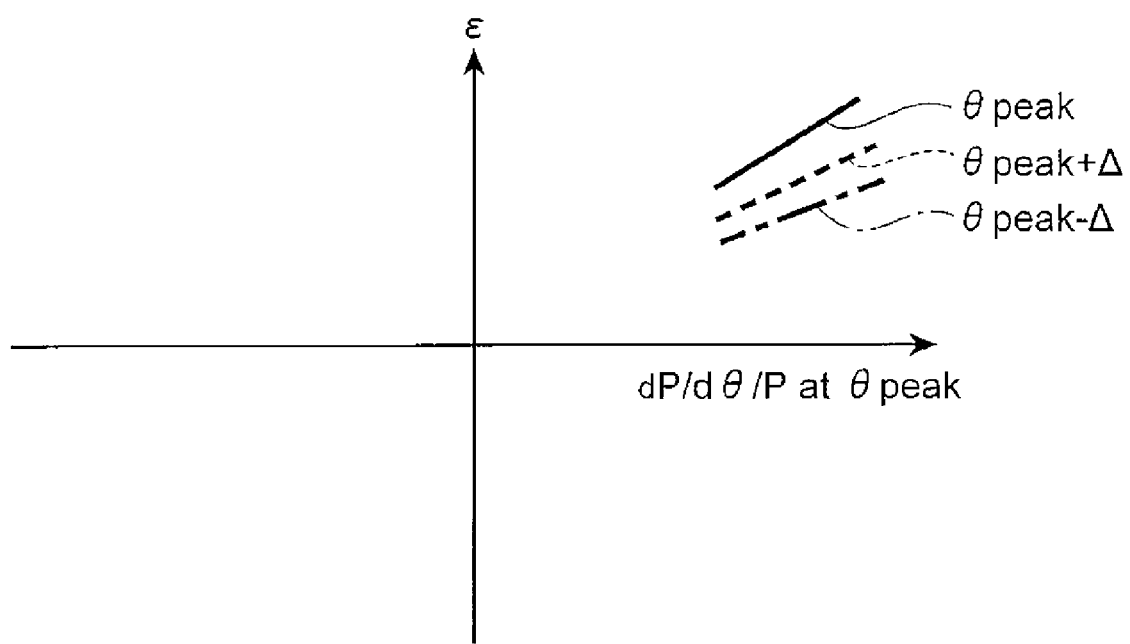
FIG. 8 is a diagram illustrating an example of the relationship between the in-cylinder pressure change rate and the compression ratio obtained by normalizing the in-cylinder pressure differential value, which is obtained by differentiating the in-cylinder pressure with the crank angle, by the in-cylinder pressure.
Figure 9:
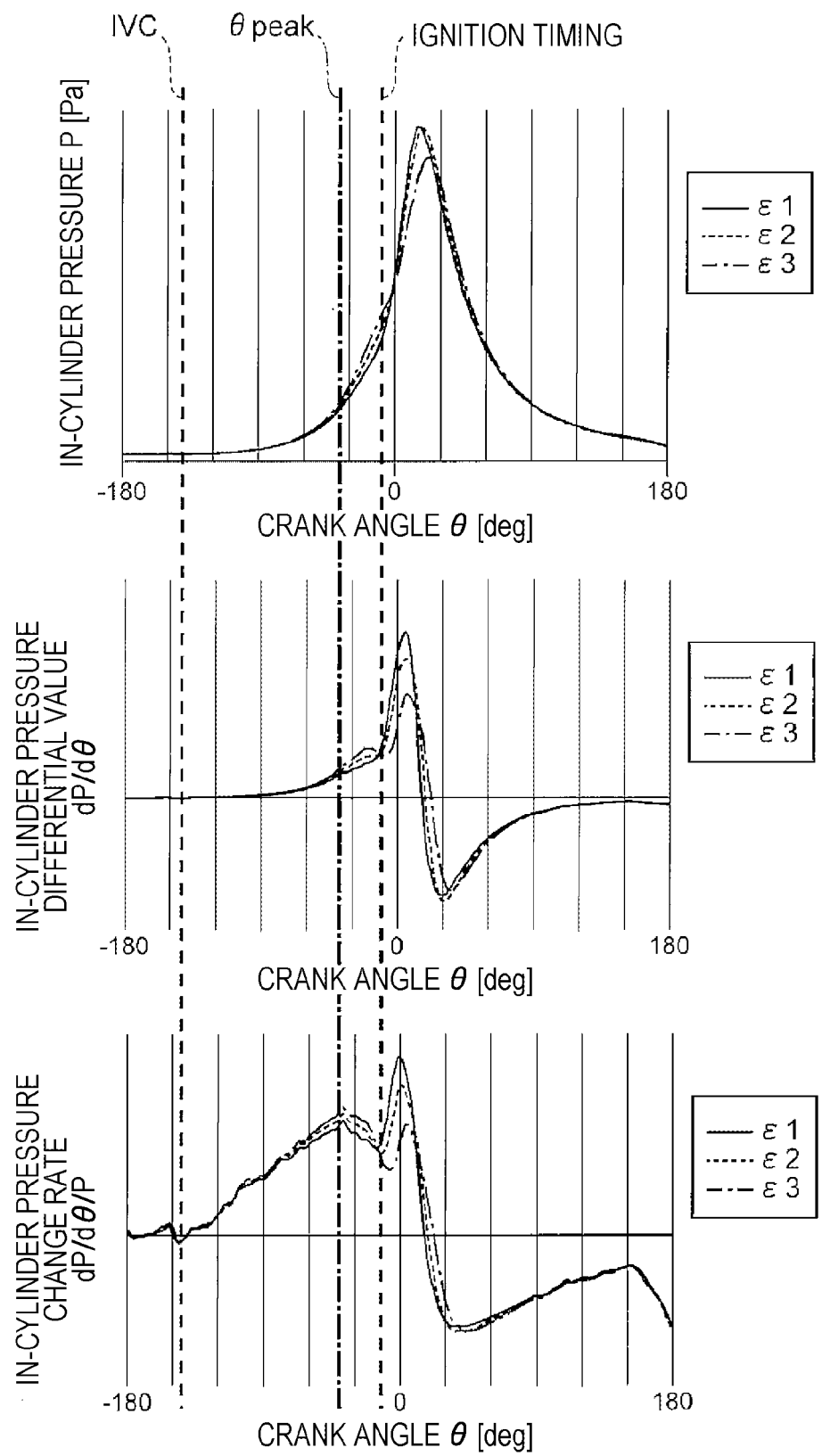
FIG. 9 illustrates graphs representing, from top down, examples of the in-cylinder pressure, the in-cylinder pressure differential value, and the in-cylinder pressure change rate.

Here, from Equation 4, dP/dθ/P (in-cylinder pressure change rate obtained by normalizing the in-cylinder pressure differential value, which is obtained by differentiating the in-cylinder pressure P by the in-cylinder pressure P, with the crank angle θ) is proportional to dV/dθ/V, so that the relationship between the compression ratio ε and dP/dθ/P is provided as illustrated by the solid line in FIG. 8. Therefore, as illustrated in FIG. 9, the in-cylinder pressure P is measured near θpeak (the upper graph in FIG. 9), the in-cylinder pressure P is differentiated by the crank angle θ to calculate the in-cylinder pressure differential value dP/dθ (the middle graph in FIG. 9), and the in-cylinder pressure differential value dP/dθ is normalized with the in-cylinder pressure P to obtain the in-cylinder pressure change rate dP/dθ/P (the lower graph in FIG. 9). Then, the actual compression ratio ε is estimated on the basis of the relationship between the in-cylinder pressure change rate dP/dθ/P and the compression ratio ε obtained in advance as illustrated in FIG. 8.

Note that, with respect to Equation 4, the Equation 4 is the equation in terms of only the in-cylinder pressure P, the volume V, and the specific heat ratio γ. The specific heat ratio γ is uniquely determined if the gas component is determined. Even when the component ratio of the fuel changes, the specific heat ratio γ is approximately 1.3, so that Equation 4 is supposed to hold regardless of the operating conditions.

In addition, when carefully observing the lower graph in FIG. 9 (indicating the in-cylinder pressure change rate dP/dθ/P), dP/dθ/P changes depending on the compression ratio ε at the timing of θpeak and before and after the timing of θpeak. When plotted for Δ before and after the θpeak, for example, the relationship between dP/dθ/P and the compression ratio ε is as illustrated by a broken line or a dashed line in FIG. 8. It can be seen that even with this relationship, the compression ratio (actual compression ratio) ε can be estimated from dP/dθ/P.

Here, in terms of the range in which dP/dθ/P is correlated to the compression ratio ε before and after θpeak, the range is fixed so that Equation 4 can hold or the adiabatic change can occur in the combustion chamber 112, which is the premise for the derivation of Equations 2 to 4. More specifically, the range is fixed from the valve closing timing or timing for intake valve close (IVC) of the intake valve 109 to the start of ignition of air-fuel mixture and heat generation in the combustion chamber 112 (see FIGS. 6 and 9).

Note that, in the above description, from the proportional relationship between the in-cylinder pressure change rate dP/dθ/P and the in-cylinder volume change rate dV/dθ/V, the in-cylinder pressure change rate dP/dθ/P is obtained before the actual compression ratio ε is estimated. Needless to say, however, if the relationship between the in-cylinder pressure P and the in-cylinder volume V is obtained in advance, the actual compression ratio ε can be estimated (calculated) from the in-cylinder pressure differential value dP/dθ obtained by differentiating the in-cylinder pressure P with respect to the crank angle θ (i.e., the change of the in-cylinder pressure P with respect to the crank angle θ).

As described above, the control device 200 according to the present embodiment calculates the compression ratio ε on the basis of dP/dθ which is the change of the in-cylinder pressure P with respect to the crank angle θ at the timing from closing of the intake valve 109 to ignition of the air-fuel mixture in the cylinder (air cylinder) 101. More specifically, the control device 200 calculates the compression ratio on the basis of the in-cylinder pressure change rate dP/dθ/P obtained by normalizing the change dP/dθ of the in-cylinder pressure P with respect to the crank angle θ with the in-cylinder pressure P. Thus, the actual compression ratio ε of the internal combustion engine 100 can be estimated.

Figure 10:
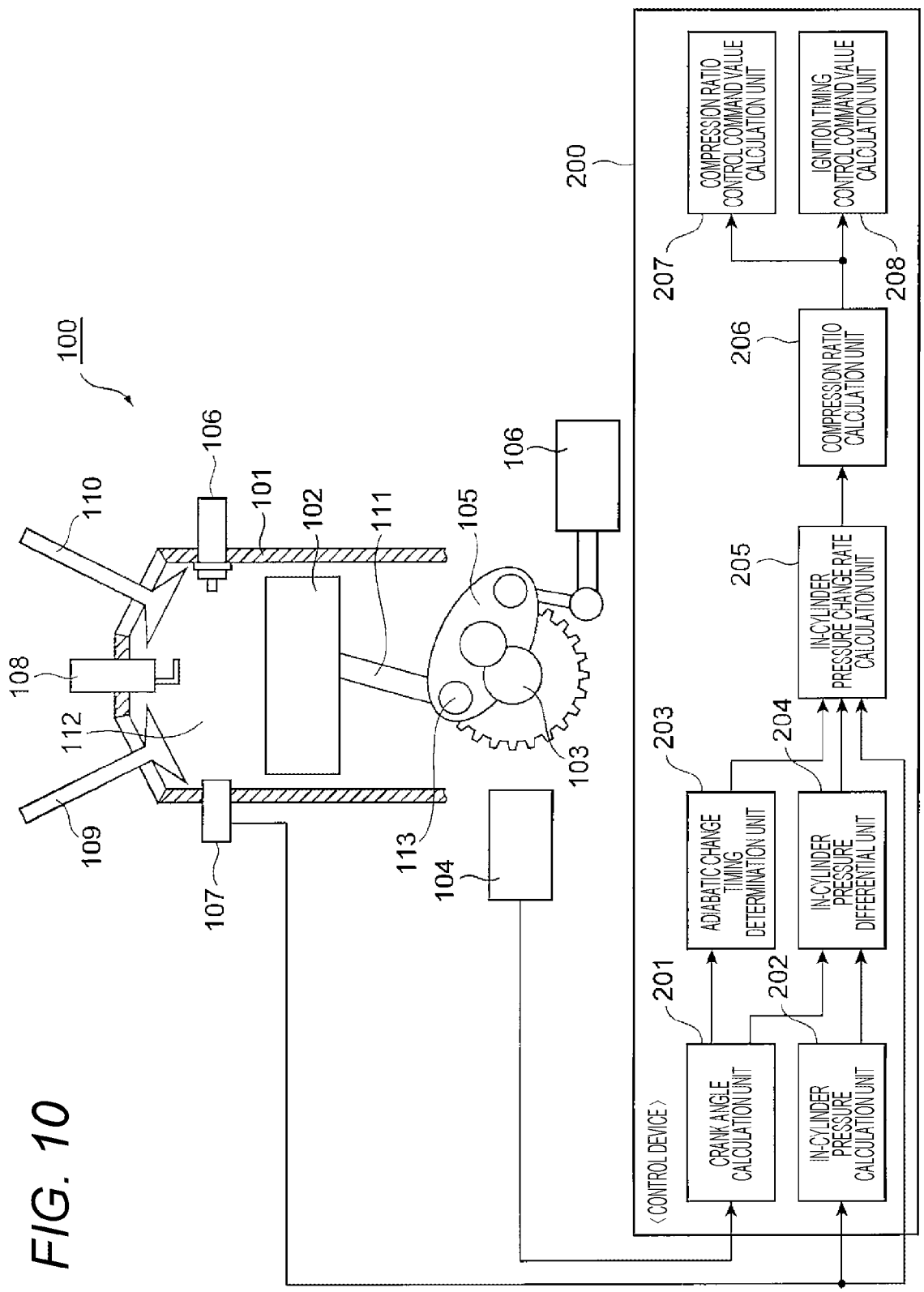
FIG. 10 is a block diagram illustrating an internal configuration of a control device according to an embodiment of the present invention.

FIG. 10 illustrates an internal configuration of the control device that executes estimate of the compression ration as described above according to the embodiment of the present invention.

The control device 200 illustrated in FIG. 10 is basically constituted by a microcomputer including input/output ports, a RAM, a ROM, a CPU, and the like, and mainly includes a crank angle calculation unit 201, an in-cylinder pressure calculation unit 202, an adiabatic change timing determination unit 203, an in-cylinder pressure differential unit 204, an in-cylinder pressure change rate calculation unit 205, and a compression ratio calculation unit 206.

The crank angle calculation unit 201 obtains a signal from the crank angle sensor 104 provided on the crank shaft 103 and calculates the crank angle θ of the crank shaft 103.

The in-cylinder pressure calculation unit 202 obtains a signal from the in-cylinder pressure sensor 107 provided in the cylinder 101 and calculates the pressure (in-cylinder pressure) P in the cylinder 101.

The adiabatic change timing determination unit 203 determines whether the crank angle θ calculated by the crank angle calculation unit 201 is at the timing when the adiabatic change occurs in the combustion chamber 112 (in the cylinder) (i.e., the timing after closing of the intake valve 109 until the start of ignition of the air-fuel mixture in the cylinder 101).

The in-cylinder pressure differential unit 204 differentiates the in-cylinder pressures P (three examples corresponding to different compression ratios are illustrated in the upper graph in FIG. 9) calculated by the in-cylinder pressure calculation unit 202 with respect to the crank angle θ calculated by the crank angle calculation unit 201, and calculates the in-cylinder pressure differential value dP/dθ (results of differentiating the three in-cylinder pressures P illustrated in the upper graph in FIG. 9 are plotted in the middle graph FIG. 9).

The in-cylinder pressure change rate calculation unit 205 normalizes the in-cylinder pressure differential values dP/dθ calculated by the in-cylinder pressure differential unit 204 with the in-cylinder pressure P at the timing when the adiabatic change timing determination unit 203 determines that the adiabatic change occurs in the combustion chamber 112, and calculates the in-cylinder pressure change rate dP/dθ/P (results of normalization of the three in-cylinder pressure differential values dP/de illustrated in the middle graph in FIG. 9 are plotted in the lower graph in FIG. 9). Note that, in FIG. 9, the in-cylinder pressure change rate dP/dθ/P calculated from the in-cylinder pressure P is illustrated, but it is not necessary to calculate the in-cylinder pressure change rate dP/dθ/P over the entire range, and it is only necessary to calculate the in-cylinder pressure change rate dP/dθ/P at or in the vicinity of θpeak.

The compression ratio calculation unit 206 calculates the compression ratio (actual compression ratio) ε from the in-cylinder pressure change rate dP/θ/P calculated by the in-cylinder pressure change rate calculation unit 205, and the predetermined relationship between the in-cylinder pressure change rate dP/dθ/P and the compression ratio ε as illustrated in FIG. 8.

Thus, the actual compression ratio ε of the internal combustion engine 100 can be estimated without being limited to the time of fuel cut of the internal combustion engine 100 and without being affected by the intake air amount or the intake air temperature.

Further, the control device 200 of the present embodiment also includes, for example, as a structure to perform feedback control on the basis of the compression ratio ε calculated (estimated) by the compression ratio calculation unit 206, a compression ratio control command value calculation unit 207 that calculates a command value for compression ratio control for variably for controlling the variable compression ratio mechanism on the basis of the compression ratio ε calculated by the compression ratio calculation unit 206, and an ignition timing control command value calculation unit 208 for calculating a command value for ignition timing control for controlling the ignition timing of the air-fuel mixture in the cylinder 101 with the ignition plug 108 on the basis of the compression ratio ε calculated by the compression ratio calculation unit 206.

In the variable compression ratio engine 100, as described above, the compression ratio commanded by the control device 200 (target compression ratio) may be different from the compression ratio resulting from the actual control (actual compression ratio) due to manufacturing variations of the link mechanism 105 or the like. For example, assume that the relationship between the command value supplied to the control device 200 in advance and the actual compression ratio is the relationship indicated by the solid line in FIG. 11. However, if the characteristic indicated by the dotted line has been changed due to a manufacturing error of the link mechanism 105, the actual compression ratio turns to εr even when the command value εc is input to (the compression ratio controller 106 controlling the link mechanism 105 constituting) the variable compression ratio mechanism to achieve the target compression ratio εtarget.

Figure 11:
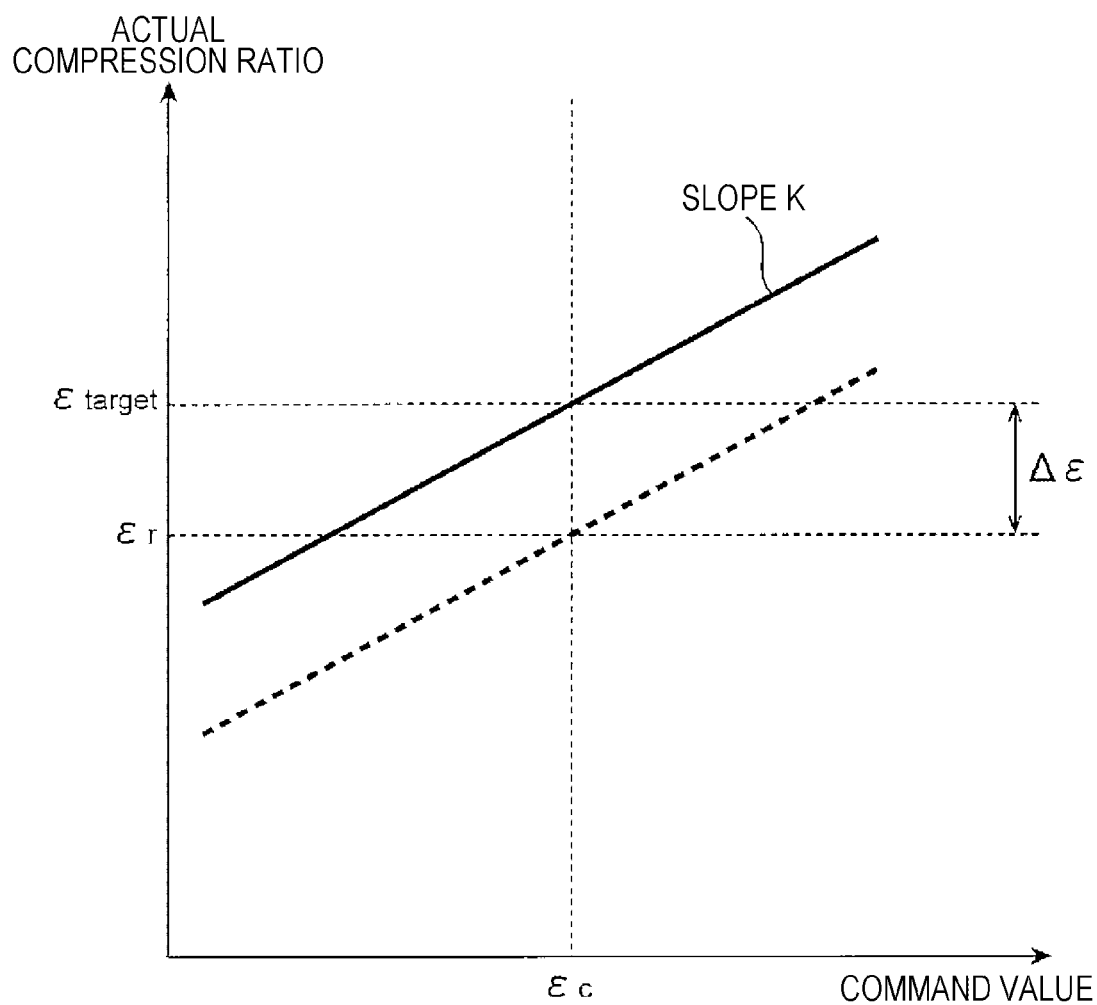
FIG. 11 is a graph illustrating an example of a relationship between a command value and an actual compression ratio.

Therefore, the compression ratio control command value calculation unit 207 calculates a difference Δε=εtarget−εr between the compression ratio εr calculated by the compression ratio calculation unit 206 and a target compression ratio εtarget, and corrects the command value εc on the basis of the value Δε/K obtained in advance by dividing Δε by the slope K and illustrated by a solid line or a dotted line in FIG. 11 to achieve the target compression ratio εtarget. In other words, when the compression ratio εr calculated by the compression ratio calculation unit 206 is different from the preset target compression ratio εtarget, the control device 200 of the present embodiment corrects the compression ratio control command value εc for variably controlling the variable compression ratio mechanism on the basis of the difference Δε between the calculated compression ratio εr and the target compression ratio εtarget. More specifically, the control device 200 of the present embodiment corrects the compression ratio control command value εc for variably controlling the variable compression ratio mechanism on the basis of the value Δε/K obtained by dividing the difference Δε between the compression ratio εr calculated by the compression ratio calculation unit 206 and the target compression ratio εtarget by the slope K of the predetermined control characteristic. With this configuration, the target compression ratio εtarget can be achieved.

Figure 12:
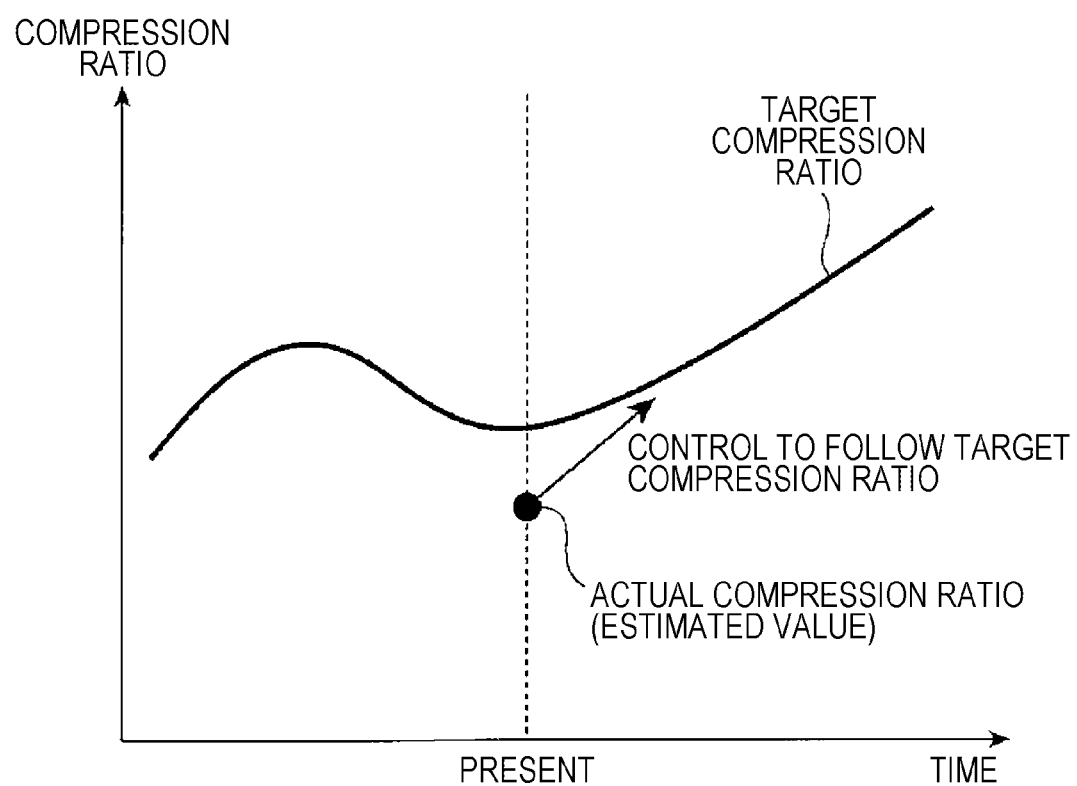
FIG. 12 is a graph illustrating an example of a target compression ratio and an actual compression ratio.

Further, the target compression ratio εtarget is not fixed and varies depending on the operating state, such as the rotation speed, the load, or the like, of the internal combustion engine 100. For example, as illustrated by the solid line in FIG. 12, when the target compression ratio εtarget is given and the actual compression ratio ε is estimated by the compression ratio calculation unit 206, the compression ratio control command value calculation unit 207 can also control the command value for the compression ratio control so that its compression ratio ε traces (follows) the target compression ratio εtarget (target value determined according to the operating state of the internal combustion engine 100), thus achieving the target compression ratio εtarget.

Further, the estimated value of the compression ratio calculated by the compression ratio calculation unit 206 may be applied other than to achieving the target compression ratio εtarget.

For example, a change factor of the compression ratio ε may be adhesion of deposits such as soot other than the manufacturing variations of the link mechanism 105. The change of the compression ratio corresponding to the adhesion of deposits can be corrected by controlling the variable compression ratio mechanism, if provided, as described above, but there is a case where no variable compression ratio mechanism is provided. In such a case, instead of controlling the change of the compression ratio, the engine 100 can be stably and efficiently controlled by controlling the ignition timing, the air-fuel ratio, or a supercharging pressure, if provided in the engine.

For example, if the compression ratio ε increases due to deposits such as soot, the increase in the compression ratio ε can be detected by the above-described configuration.

In a typical engine, the ignition timing of the air-fuel mixture in the cylinder 101 is advanced to the knocking limit to improve efficiency. If the compression ratio ε rises due to the deposit and becomes larger than a preset target compression ratio εtarget in the advanced state, knocking occurs. Therefore, when detecting an increase of the compression ratio ε, the ignition timing control command value calculation unit 208 can avoid the knocking by controlling the command value for the ignition timing control to the ignition plug 108 so as to delay the ignition timing correspondingly.

As described above, the control device 200 according to the present embodiment calculates the compression ratio ε on the basis of the change dP/dθ of the in-cylinder pressure P with respect to the crank angle θ at the timing from the closing of the intake valve 109 to the start of ignition of the air-fuel mixture in the cylinder (air cylinder) 101. More specifically, the control device 200 calculates the compression ratio ε on the basis of the in-cylinder pressure change rate dP/dθ/P obtained by normalizing the change dP/dθ of the in-cylinder pressure P with respect to the crank angle θ with the in-cylinder pressure P. Thus, the actual compression ratio ε of the internal combustion engine 100 can be estimated at the time of fuel cut of the internal combustion engine 100 and without being affected by the intake air amount and the intake air temperature.

Figure 13:
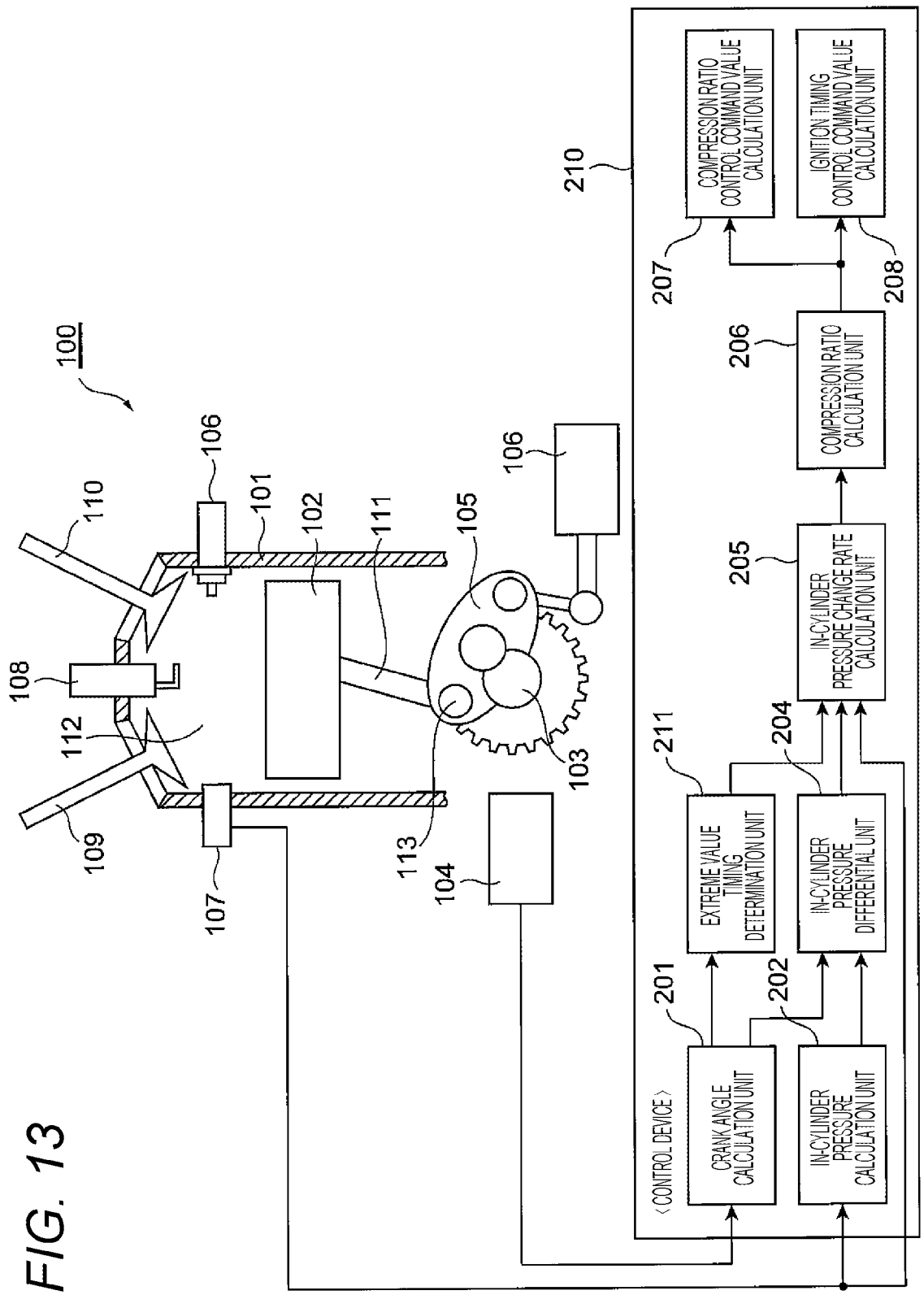
FIG. 13 is a block diagram illustrating an internal configuration of a control device according to another embodiment other than the embodiment of FIG. 10.

FIG. 13 illustrates an internal configuration of another embodiment other than the control device 200 illustrated in FIG. 10.

In a control device 210 illustrated in FIG. 13, the adiabatic change timing determination unit 203 of the control device 200 illustrated in FIG. 10 is replaced by an extreme value timing determination unit 211 that determines timing θpeak (see FIGS. 6 and 9) at which the previously-input in-cylinder volume change rate dV/dθ/V (which is the value obtained by normalizing the change dV/dθ of the in-cylinder volume V with respect to the crank angle θ with the in-cylinder volume V) from the crank angle θ calculated by the crank angle calculation unit 201. Note that the configuration of control device 210 other than the extreme value timing determination unit 211 is substantially similar to that in the configuration of the control device 200 illustrated in FIG. 10.

Specifically, the crank angle calculation unit 201 of the control device 210 acquires the signal of the crank angle sensor 104 provided on the crank shaft 103 and calculates the crank angle θ of the crank shaft 103.

The in-cylinder pressure calculation unit 202 obtains a signal from the in-cylinder pressure sensor 107 provided in the cylinder 101 and calculates the pressure (in-cylinder pressure) P in the cylinder 101.

The extreme value timing determination unit 211 determines whether the crank angle θ calculated by the crank angle calculation unit 201 matches the timing θpeak at which the previously-input in-cylinder volume change rate dV/dθ/V takes an extreme value.

The in-cylinder pressure differential unit 204 differentiates the in-cylinder pressures P (three examples corresponding to different compression ratios are illustrated in the upper graph in FIG. 9) calculated by the in-cylinder pressure calculation unit 202 with respect to the crank angle θ calculated by the crank angle calculation unit 201, and calculates the in-cylinder pressure differential value dP/dθ (results of differentiating the three in-cylinder pressures P illustrated in the upper graph in FIG. 9 are plotted in the middle graph FIG. 9).

The in-cylinder pressure change rate calculation unit 205 normalizes the in-cylinder pressure differential value dP/dθ calculated by the in-cylinder pressure differential unit 204 with the in-cylinder pressure P at the timing when the in-cylinder volume change rate dV/dθ/V determined by the extreme value timing determination unit 211 takes the extreme value, and calculates the in-cylinder pressure change rate dP/dθ/P (results obtained by normalizing the three in-cylinder pressure differential values dP/dθ illustrated in the middle graph in FIG. 9 are plotted in the lower graph in FIG. 9). Note that FIG. 9 illustrates the in-cylinder pressure change rate dP/dθ/P calculated from the in-cylinder pressure P, but it is not necessary to calculate the in-cylinder pressure change rate dP/dθ/P over the entire range, and it is only necessary to calculate the in-cylinder pressure change rate dP/dθ/P at θpeak.

The compression ratio calculation unit 206 calculates the compression ratio (actual compression ratio) ε from the in-cylinder pressure change rate dP/dθ/P calculated by the in-cylinder pressure change rate calculation unit 205, and the predetermined relationship between the in-cylinder pressure change rate dP/dθ/P and the compression ratio ε as illustrated in FIG. 8.

Thus, as in the example illustrated in FIG. 10, the actual compression ratio ε of the internal combustion engine 100 can be estimated without being limited to the time of fuel cut of the internal combustion engine 100 and without being affected by the intake air amount or the intake air temperature.

Thus, the control device 210 of the present embodiment calculates the compression ratio ε on the basis of the change dP/dθ of the in-cylinder pressure P with respect to the crank angle θ at the timing when the in-cylinder volume change rate dV/dθ/V takes the extreme value. More specifically, the control device 210 calculates the compression ratio ε on the basis of the in-cylinder pressure change rate dP/dθ/P obtained by normalizing the change dP/dθ of the in-cylinder pressure P with respect to the crank angle θ with the in-cylinder pressure P. Thus, the actual compression ratio ε of the internal combustion engine 100 can be estimated at the time of fuel cut of the internal combustion engine 100 and without being affected by the intake air amount and the intake air temperature, whereby an estimation accuracy of the compression ratio ε improves.

Note that the present invention is not limited to the above-described embodiment and may include various modifications. For example, the embodiment has been described in detail to facilitate the understanding of the present invention, and is not necessarily limited to the embodiment that includes the entire structure described above.

Further, all or part of the above-described configurations, functions, processing units, processing means, and the like may be implemented by hardware by designing, for example, as the integrated circuit. Further, the above-described configuration or functions may be implemented by software by a processor by interpreting individual programs for implementing such configurations or functions. The information of programs, tables, or files that implement individual functions may be stored on a recording device, such as a memory, a hard disc, or a solid state drive (SSD), or a recording medium, such as an IC card, an SD card, or a DVD.

Control lines and information lines described above have been considered to be needed for description, but those lines may not represent all lines necessary for a manufactured product. In practice, most of the constituent components are considered to be connected mutually.

REFERENCE SIGNS LIST

100 internal combustion engine
101 cylinder
101 piston
103 crank shaft
104 crank angle sensor
105 link mechanism
106 injector
107 in-cylinder pressure sensor
108 ignition plug
109 intake valve
110 exhaust valve
111 connecting rod
112 combustion chamber
113 connecting point
200, 210 control device
201 crank angle calculation unit
202 in-cylinder pressure calculation unit
203 adiabatic change timing determination unit
204 in-cylinder pressure differential unit
205 in-cylinder pressure change rate calculation unit
206 compression ratio calculation unit
207 compression ratio control command value calculation unit
208 ignition timing control command value calculation unit
211 extreme value timing determination unit

The invention claimed is:

1. A control device for an internal combustion engine capable of estimating a compression ratio of an internal combustion engine including a cylinder in which an intake valve and an exhaust valve open and close in synchronization with rotation of a crank shaft connected to a piston, wherein the control device calculates the compression ratio in accordance with a change of in-cylinder pressure with respect to a crank angle at timing from closing of the intake valve to a start of ignition of an air-fuel mixture in the cylinder, and the control device calculates the compression ratio in accordance with the change of the in-cylinder pressure with respect to the crank angle at timing when an in-cylinder volume change rate obtained by normalizing a change of in-cylinder volume with respect to the crank angle by in-cylinder volume takes an extreme value.

2. The control device for the internal combustion engine according to claim 1, wherein
the control device calculates the compression ratio in accordance with an in-cylinder pressure change rate obtained by normalizing the change of the in-cylinder pressure with respect to the crank angle by an in-cylinder pressure.

3. The control device for the internal combustion engine according to claim 2, wherein
the control device calculates the compression ratio from a relationship between the predetermined in-cylinder pressure change rate and the compression ratio.

4. The control device for the internal combustion engine according to claim 1, wherein
the internal combustion engine includes a variable compression ratio mechanism that allows the compression ratio to be variable, and
when the calculated compression ratio is different from a preset target compression ratio, the control device corrects a command value for compression ratio control for variably controlling the variable compression ratio mechanism in accordance with a difference between the calculated compression ratio and the target compression ratio.

5. The control device for the internal combustion engine according to claim 4, wherein
the control device corrects the command value for the compression ratio control in accordance with a value obtained by dividing a difference between the calculated compression ratio and the target compression ratio by a slope of a predetermined control characteristic.

6. The control device for the internal combustion engine according to claim 1, wherein
the internal combustion engine includes a variable compression ratio mechanism that allows the compression ratio to be variable, and
the control device controls a command value for compression ratio control for variably controlling the variable compression ratio mechanism in a manner that the calculated compression ratio follows a target value determined by an operating state of the internal combustion engine.

7. The control device for the internal combustion engine according to claim 1, wherein
when the calculated compression ratio is larger than a preset target compression ratio, the control device controls a command value for ignition timing control in a manner that ignition timing of the air-fuel mixture is delayed in the cylinder.

8. A control device for an internal combustion engine capable of estimating a compression ratio of an internal combustion engine including a cylinder in which an intake valve and an exhaust valve open and close in synchronization with rotation of a crank shaft connected to a piston, the control device comprising:
a crank angle calculation unit that calculates a crank angle of the crank shaft;
an in-cylinder pressure calculation unit that calculates an in-cylinder pressure of the cylinder;
an adiabatic change timing determination unit that determines, from the crank angle calculated by the crank angle calculation unit, timing from closing of the intake valve to a start of ignition of an air-fuel mixture in the cylinder;
an in-cylinder pressure differential unit that calculates an in-cylinder pressure differential value by differentiating the in-cylinder pressure calculated by the in-cylinder pressure calculation unit with respect to the crank angle calculated by the crank angle calculation unit;
an in-cylinder pressure change rate calculation unit that calculates an in-cylinder pressure change rate by normalizing the in-cylinder pressure differential value with the in-cylinder pressure at the timing determined by the adiabatic change timing determination unit; and
a compression ratio calculation unit that calculates the compression ratio in accordance with the in-cylinder pressure change rate calculated by the in-cylinder pressure change rate calculation unit.

9. The control device for the internal combustion engine according to claim 8, further comprising one or both of:
a compression ratio control command value calculation unit that calculates, in accordance with the compression ratio calculated by the compression ratio calculation unit, a compression ratio control command value for variably controlling the variable compression ratio mechanism that allows the compression ratio to be variable; and
an ignition timing control command value calculation unit that calculates, in accordance with the compression ratio calculated by the compression ratio calculation unit, an ignition timing control command value that controls ignition timing of the air-fuel mixture in the cylinder.

10. A control device for an internal combustion engine capable of estimating a compression ratio of an internal combustion engine including a cylinder in which an intake valve and an exhaust valve open and close in synchronization with rotation of a crank shaft connected to a piston, the control device comprising:
a crank angle calculation unit that calculates a crank angle of the crank shaft;
an in-cylinder pressure calculation unit that calculates an in-cylinder pressure of the cylinder;
an extreme value timing determination unit that determines, from the crank angle calculated by the crank angle calculation unit, timing at which an in-cylinder volume change rate obtained by normalizing a change of in-cylinder volume with respect to the crank angle by the in-cylinder volume takes an extreme value;
an in-cylinder pressure differential unit that calculates an in-cylinder pressure differential value by differentiating the in-cylinder pressure calculated by the in-cylinder pressure calculation unit with respect to the crank angle calculated by the crank angle calculation unit;
an in-cylinder pressure change rate calculation unit that calculates an in-cylinder pressure change rate by normalizing the in-cylinder pressure differential value with an in-cylinder pressure at timing determined by the extreme value timing determination unit; and a compression ratio calculation unit that calculates the compression ratio in accordance with the in-cylinder pressure change rate calculated by the in-cylinder pressure change rate calculation unit.

11. The control device for the internal combustion engine according to claim 10, further comprising one or both of:
a compression ratio control command value calculation unit that calculates, in accordance with the compression ratio calculated by the compression ratio calculation unit, a compression ratio control command value for variably controlling the variable compression ratio mechanism that allows the compression ratio to be variable; and
an ignition timing control command value calculation unit that calculates, in accordance with the compression ratio calculated by the compression ratio calculation unit, an ignition timing control command value that controls ignition timing of the air-fuel mixture in the cylinder.

* * * * *